(12) United States Patent
Kaita et al.

(10) Patent No.: US 8,106,649 B2
(45) Date of Patent: Jan. 31, 2012

(54) ANGLE DETECTING APPARATUS AND ANGLE DETECTING METHOD

(75) Inventors: Yoshio Kaita, Tokyo (JP); Hirokazu Miyamoto, Tokyo (JP); Toshinao Kido, Tokyo (JP)

(73) Assignee: TDK Corporation, Tokyo (JP)

( * ) Notice: Subject to any disclaimer, the term of this patent is extended or adjusted under 35 U.S.C. 154(b) by 396 days.

(21) Appl. No.: 12/458,416

(22) Filed: Jul. 10, 2009

(65) Prior Publication Data

US 2010/0007340 A1     Jan. 14, 2010

(30) Foreign Application Priority Data

Jul. 14, 2008   (JP) ................. 2008-182423
Feb. 12, 2009   (JP) ................. 2009-030015

(51) Int. Cl.
*G01B 7/30*   (2006.01)
(52) U.S. Cl. ................................. 324/207.25
(58) Field of Classification Search .............. 324/207.25
See application file for complete search history.

(56) References Cited

U.S. PATENT DOCUMENTS

| 6,762,897 B1 | 7/2004 | Kabashima et al. |
| 2005/0162157 A1 | 7/2005 | Kamizino et al. |

FOREIGN PATENT DOCUMENTS

| CN | 1271416 A | 10/2000 |
| JP | A-9-287911 | 11/1997 |
| JP | A-2001-91208 | 4/2001 |
| JP | B2-3200405 | 8/2001 |
| JP | A-2005-214750 | 8/2005 |

*Primary Examiner* — Reena Aurora
(74) *Attorney, Agent, or Firm* — Oliff & Berridge, PLC

(57) ABSTRACT

An angle detecting apparatus includes a rotor fixed to a rotating shaft, a pair of magnetic sensors arranged opposite each other so as to output a first detection signal and a second detection signal, respectively, each of which contains information on the angle of rotation of the rotor, a differential operational circuit performing differential operation on the first detection signal and the second detection signal, and an angle calculating circuit calculating the angle of rotation of the rotating shaft based on the result of the differential operation by the differential operational circuit. Here, the distance between two points where a straight line passing through the center of rotation of the rotor crosses the outer periphery of the rotor is constant.

12 Claims, 10 Drawing Sheets

ANGLE DETECTING APPARATUS AND ANGLE DETECTING METHOD

BACKGROUND OF THE INVENTION

1. Field of the Invention

The present invention relates to an angle detecting apparatus and an angle detecting method for calculating the angle of rotation of a rotating shaft.

2. Description of the Related Art

Japanese Patent Laid-Open No. 2001-91208 proposes an angle of rotation detecting apparatus as means for detecting the angle of rotation of a detection target such as a throttle valve. The angle of rotation detecting apparatus is configured such that a magnetic field is generated between a magnet and a yoke and that a magnetic detection element located in the magnetic field is displaced from the center of rotation of a rotor. Displacing the position of the magnetic detection element from the center of rotation of the rotor changes the relationship between the angle of a magnetic flux crossing the magnetic detection element and the angle of rotation of the rotor. This change can be utilized to optionally set the output property of the magnetic detection element to any value within a wide range of values with respect to the angle of rotation. Thus, the property of detecting the angle of rotation can be improved.

However, the above-described angle of rotation detecting apparatus is disadvantageous in that a given limit is imposed on the detected angle (see FIG. 8B in Japanese Patent Laid-Open No. 2001-91208).

SUMMARY OF THE INVENTION

Thus, an object of the present invention is to propose an angle detecting apparatus and an angle detecting method in which no limit is imposed on the detected angle.

To accomplish the object, the present invention provides an angle detecting apparatus having a rotor fixed to a rotating shaft, wherein the rotor is such that a distance between two points where a straight line passing through a center of rotation of the rotor crosses an outer periphery of the rotor is constant; a first magnetic sensor and a second magnetic sensor arranged opposite each other and close to an outer periphery of the rotor, wherein the first magnetic sensor detects a change in a magnetic field corresponding to a change in a first distance between the outer periphery of the rotor and the first magnetic sensor which distance varies periodically in conjunction with rotation of the rotor, thereby outputting a first detection signal, and the second magnetic sensor detects a change in a magnetic field corresponding to a change in a second distance between the outer periphery of the rotor and the second magnetic sensor which distance varies complementarily in conjunction with the variation in first distance, thereby outputting a second detection signal; differential operation means for performing differential operation on the first detection signal and the second detection signal; and angle calculating means for calculating an angle of rotation of the rotating shaft based on a result of the differential operation by the differential operation means.

The angle detecting apparatus according to the present invention uses the rotor configured such that the distance between the two points where the straight line passing through the center of rotation of the rotor crosses the outer periphery of the rotor is constant. Thus, a signal obtained by performing differential operation on the detection signals from the paired first and second magnetic sensors arranged opposite each other is a substantial sine wave signal containing information on the angle of rotation of the rotor. Consequently, angle detection can be achieved with a reduced detection error over the entire angular range (0 degrees to 360 degrees). Furthermore, the rotor need not be attached to the end surface of a detection target. Thus, the angle detecting apparatus can be easily installed. Additionally, the paired magnetic sensors are preferably arranged at the same distance from the center of rotation. This is because when the output signals are sufficiently symmetric, the differential output signal is similar to a sine wave.

Here, the shape of the rotor projected on a plane of rotation is preferably a combination of two different semiellipses. With this shape, when the rotor makes one rotation, the detection signal from each of the paired first and second magnetic sensors arranged opposite each other exhibits the maximum value an the minimum value during the rotation. Furthermore, the signal obtained by performing differential operation on the detection signals is a substantial sine wave signal very similar to an ideal sine wave signal containing information on the angle of rotation of the rotor.

In a preferred embodiment of the present invention, the rotor is made of a ferromagnetic material. The first magnetic sensor comprises a first magnet generating a magnetic field between the outer periphery of the rotor and the first magnetic sensor, and a first magnetoresistance effect element outputting the first detection signal in response to the magnetic field varying in response to variation in the first distance. The second magnetic sensor comprises a second magnet generating a magnetic field between the outer periphery of the rotor and the second magnetic sensor, and a second magnetoresistance effect element outputting the second detection signal in response to the magnetic field varying in response to variation in the second distance. In this configuration, the first distance between the rotor and the first magnetic sensor and the second distance between the rotor and the second magnetic sensor vary as the rotor rotates. These variations appear as variations in the resistance values of the first and second magnetic sensors, respectively. Thus, the first and second detection signals contain information on the angle of rotation of the rotor.

In the preferred embodiment of the present invention, the first magnetoresistance effect element comprises a first free magnetic layer whose longitudinal direction is set to align with a direction of the center of rotation of the rotor. The second magnetoresistance effect element comprises a second free magnetic layer whose longitudinal direction is set to align with the direction of the center of rotation of the rotor. By setting the longitudinal direction of the free magnetic layer to align with the direction of the center of rotation of the rotor, the accuracy of angle detection can be improved.

The present invention provides an angle detecting method of detecting an angle of rotation of a rotating shaft using a first magnetic sensor and a second magnetic sensor arranged opposite each other and close to an outer periphery of a rotor fixed to the rotating shaft, the method comprising the steps of: rotating the rotor together with the rotating shaft, wherein the rotor is such that a distance between two points where a straight line passing through a center of rotation of the rotor crosses the outer periphery of the rotor is constant; allowing a first detection signal to be output by the first magnetic sensor detecting a change in a magnetic field corresponding to a change in a first distance between the outer periphery of the rotor and the first magnetic sensor which distance varies periodically in conjunction with rotation of the rotor; allowing a second detection signal to be output by the second magnetic sensor detecting a change in a magnetic field corresponding to a change in a second distance between the outer periphery of the rotor and the second magnetic sensor which distance varies complementarily in conjunction with the variation in first distance; performing differential operation on the first detection signal and the second detection signal;

and calculating the angle of rotation of the rotating shaft based on a result of the differential operation.

The angle detecting method according to the present invention uses the rotor configured such that the distance between the two points where the straight line passing through the center of rotation of the rotor crosses the outer periphery of the rotor is constant. Thus, a signal obtained by performing differential operation on the detection signals from the paired first and second magnetic sensors arranged opposite each other is a substantial sine wave signal containing information on the angle of rotation of the rotor. Consequently, angle detection can be achieved with a reduced detection error over the entire angular range (0 degrees to 360 degrees).

Another aspect of the present invention provides an angle detecting apparatus comprising a rotor fixed to a rotating shaft, wherein the rotor is such that a distance between two points where a straight line passing through a center of rotation of the rotor crosses an outer periphery of the rotor is constant; a first magnetic sensor and a second magnetic sensor arranged at an equal distance from the center of rotation so as to have a phase difference of 90 degrees with respect to the center of rotation of the rotor, the first magnetic sensor detecting a change in a magnetic field corresponding to a change in a first distance between the outer periphery of the rotor and the first magnetic sensor which distance varies periodically in conjunction with rotation of the rotor, thereby outputting a first detection signal, the second magnetic sensor detecting a change in a magnetic field corresponding to a change in a second distance between the outer periphery of the rotor and the second magnetic sensor which distance varies periodically in conjunction with the rotation of the rotor, thereby outputting a second detection signal; a conversion table storing an angle of rotation of the rotating shaft corresponding to each of the first and second detection signals; and angle calculating means for comparing the conversion table with each of the first and second detection signals output by the first and second magnetic sensors to output the angle of rotation of the rotor.

The angle detecting apparatus according to the present invention uses the rotor configured such that the distance between the two points where the straight line passing through the center of rotation of the rotor crosses the outer periphery of the rotor is constant. In addition, the first and second magnetic sensors are arranged at the equal distance from the center of rotation so as to have a phase difference of 90 degrees (mechanical angle) with respect to the center of rotation of the rotor. Thus, the distance between the outer periphery of the rotor and each of the first and second magnetic sensors varies periodically. The first and second detection signals output by the first and second magnetic sensors, respectively, contain information on the angle of rotation of the rotor and have a phase difference of 90 degrees (electrical angle). Thus, the angle of rotation of the rotor can be determined by functionally processing the first and second detection signals.

In a preferred embodiment of the present invention, preferably, each of the first and second detection signals is a substantial sine wave signal, and the angle calculating means compares the conversion table with one of the first and second detection signals which falls within an angular range of ±45 degrees from an angle at which the detection signal takes an intermediate value, to output the angle of rotation of the rotor. By reading a value close to the intermediate value, at which amplitude varies significantly, instead of a value close to a peak of a signal waveform at which the amplitude varies insignificantly, the adverse effect of possible noise can be inhibited.

Another aspect of the present invention provides an angle detecting method of detecting an angle of rotation of a rotating shaft using a first magnetic sensor and a second magnetic sensor arranged at an equal distance from a center of rotation of a rotor fixed to the rotating shaft so as to have a phase difference of 90 degrees, the method comprising the steps of rotating the rotor together with the rotating shaft, wherein the rotor is such that a distance between two points where a straight line passing through the center of rotation of the rotor crosses the outer periphery of the rotor is constant; allowing a first detection signal to be output by the first magnetic sensor detecting a change in a magnetic field corresponding to a change in a first distance between the outer periphery of the rotor and the first magnetic sensor which distance varies periodically in conjunction with rotation of the rotor; allowing a second detection signal to be output by the second magnetic sensor detecting a change in a magnetic field corresponding to a change in a second distance between the outer periphery of the rotor and the second magnetic sensor which distance varies periodically in conjunction with the rotation of the rotor; creating a conversion table storing the angle of rotation of the rotating shaft corresponding to each of the first and second detection signals, and comparing the conversion table with each of the first and second detection signals output by the first and second magnetic sensors to output the angle of rotation of the rotor.

The angle detecting method according to the present invention uses the rotor configured such that the distance between the two points where the straight line passing through the center of rotation of the rotor crosses the outer periphery of the rotor is constant. Thus, the distance between the outer periphery of the rotor and each of the first and second magnetic sensors varies periodically; the first and second magnetic sensors are arranged at the equal distance from the center of rotation so as to have a phase difference of 90 degrees (mechanical angle) with respect to the center of rotation of the rotor. The first and second detection signals output by the first and second magnetic sensors each contain information on the angle of rotation of the rotor, and have a difference of 90 degrees in phase (electrical angle) therebetween. Thus, the angle of rotation of the rotor can be determined by functionally processing the first and second detection signals.

The present invention can provide an angle detecting apparatus and an angle detecting method in which the detected angle is not limited and the apparatus can be easily installed.

DETAILED DESCRIPTION OF THE PREFERRED EMBODIMENTS

Figure 1:
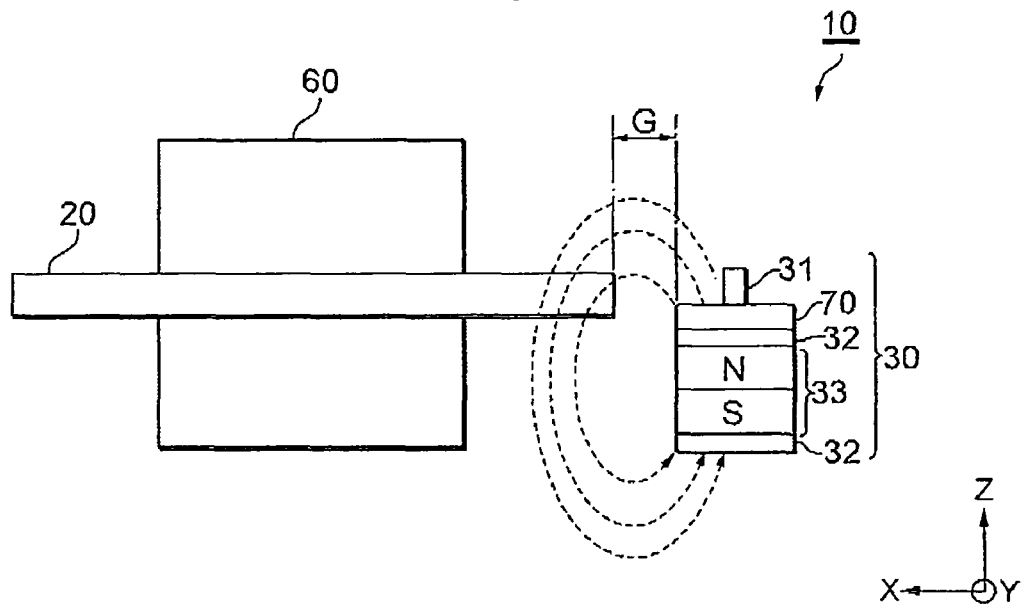
FIG. 1 is a diagram schematically illustrating the configuration of an angle detecting apparatus according to Embodiment 1.

Embodiments of the present invention will be described with reference to the drawings. In the embodiments, the same reference numerals denote the same members, and duplicate descriptions are omitted.

FIG. 1 is a diagram illustrating the configuration of an angle detecting apparatus 10 according to Embodiment 1.

The angle detecting apparatus 10 includes a rotor 20 fixed to a rotating shaft 60 and a magnetic sensor 30 located dose to the outer periphery of the rotor 20 as main components. The rotor 20 is made up of a ferromagnetic material (for example, iron, cobalt, or nickel). The rotating shaft 60 is, for example, a drive shaft of a vehicle or a drive shaft of a motor, and is rotationally driven by a driving force from a power generation source. The axial direction of the rotating shaft is a Z direction. Rotating the rotating shaft 60 rotates the rotor 20 in an XY plane.

The magnetic sensor 30 includes, as main components, a magnet 33 functioning as magnetic field generating means for generating external magnetic fields, and a magnetoresistance effect element (GMR element) 31 that detects variation in external magnetic field as variation in voltage. The magnetoresistance effect element 31 may be of a half bridge configuration or a full bridge configuration. In a preferable implementation of the magnetic sensor 30, the magnetoresistance effect element 31 is located on the front surface of a printed circuit board 70 so as to be positioned on a straight line extending in the Z direction through the center point of the magnet 33, with the magnet 33 located on the back surface of the circuit board 70. To allow external magnetic fields generated by the magnet 33 to be efficiently collected, yokes 32 are preferably arranged on the respective poles of the magnets 33.

The magnetoresistance effect element 31 includes a pin magnetic layer (not shown in the drawings) whose magnetizing direction is set in a particular direction and which is configured so as to prevent a magnetized state (for example, the magnetizing direction or the intensity of the magnetization) from being affected by displacement of external magnetic fields, and a free magnetic layer (not shown in the drawings) in which the magnetized state changes according to variation in external magnetic fields. When the rotor 20 rotates in conjunction with rotation of the rotating shaft 60, the length of the gap G between the outer periphery of the rotor 20 and the magnetoresistance effect element 31 varies periodically. A change in the length of the gap G changes the magnetic flux density drawn from the magnet 33 located on the back surface of the magnetoresistance effect element 31, to the rotor 20 through the magnetoresistance effect element 31. This changes the magnetized state of the free magnetic layer in the magnetoresistance effect element 31. This in turn results in a difference in change in magnetized state between the pin magnetic layer, in which the magnetized state does not vary, and the free magnetic layer, in which the magnetized state varies. The difference in change in magnetized state is a physical quantity reflecting the angle of rotation of the rotor 20. Specifically, the difference appears as a change in the resistance value of the magnetoresistance effect element 31. The magnetoresistance effect element 31 is supplied with a bias current by the printed circuit board 70. A change in the resistance value of the magnetoresistance effect element 31 is detected as a change in output voltage. The output voltage from the magnetoresistance effect element 31 is processed in the form of a detection signal indicating the angle of rotation of the rotor 20.

Figure 3:
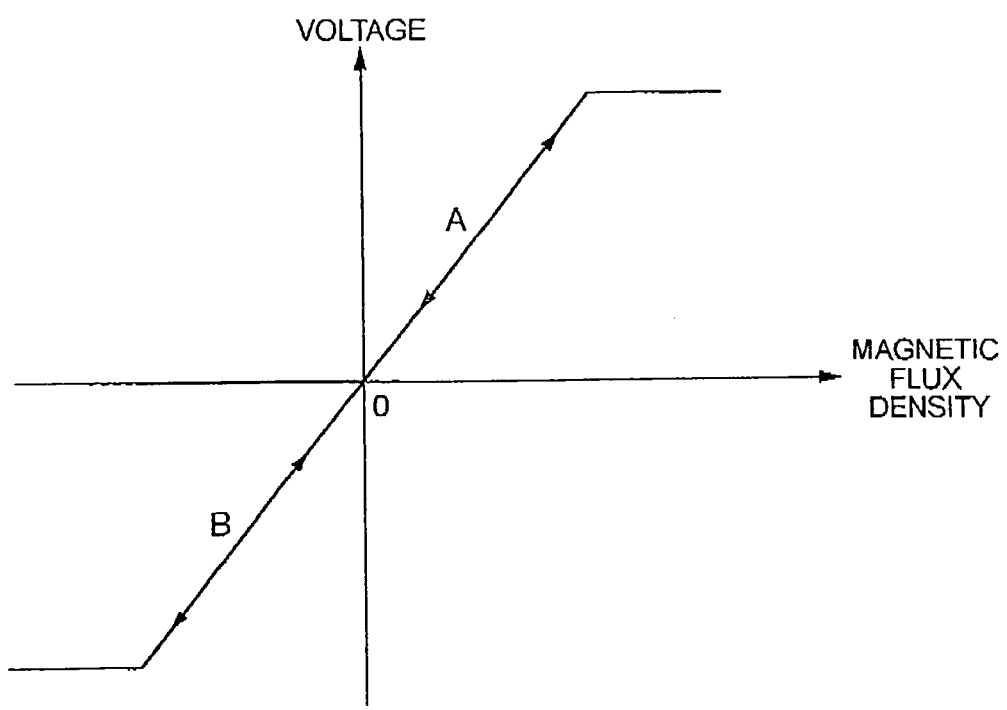
FIG. 3 is a graph showing the output property of a magnetoresistance effect element.

The intensity of external magnetic fields, the average length of the gap G, and the like are preferably designed such that the operating region of the magnetoresistance effect element 31 corresponds to regions A and B in which the magnetic flux density and the output voltage from the magnetoresistance effect element 31 have a linear relationship as shown in FIG. 3. In this case, an output from the magnetic sensor exhibits linearity according to the length of the gap G. The positional relationship, in a thrust direction (axial direction), between the rotor 20 and the magnetic sensor 30 is desirably such that the rotor 20 is prevented not only from coming off from the magnetoresistance effect element 31 but also from being displaced as a result of run-out caused by the rotation thereof. For example, when a mounting error is ±0.5 mm, the magnitude of run-out is ±0.5 mm, and the thickness of the magnetoresistance effect element 31 is 0.5 mm, the thickness of the rotor 20 is desirably at least 3.0 mm.

Figure 2:
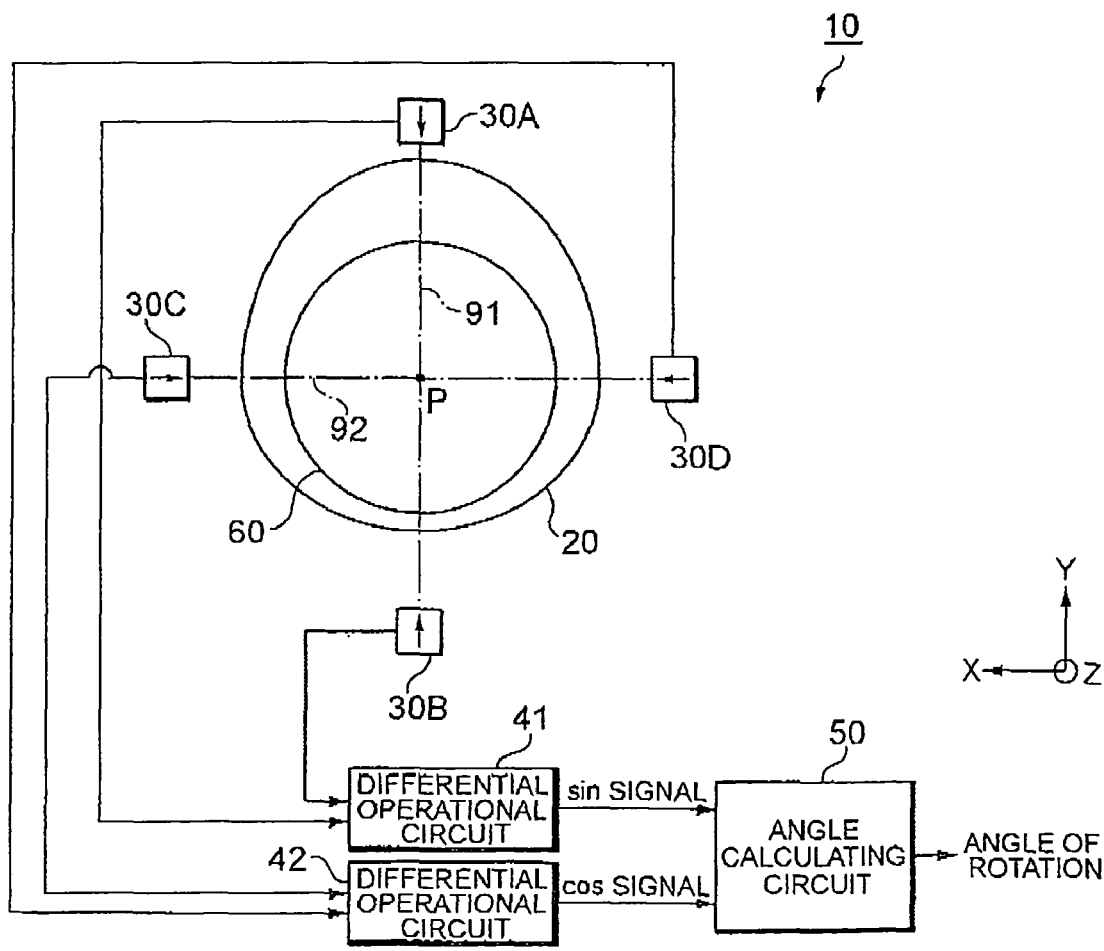
FIG. 2 is a diagram illustrating the system configuration of the angle detecting apparatus according to Embodiment 1.

FIG. 2 is a diagram illustrating the system configuration of the angle detecting apparatus 10.

The shape (hereinafter referred to as the planar shape) of the rotor 20 projected on a plane of rotation therefor (XY plane) is such that for any straight line passing through the center of rotation P of the rotor 20, the distance between two points where the straight line crosses the outer periphery of the rotor 20 is constant. In the present embodiment, an example of such a shape is a combination of two different semiellipses. However, the present embodiment is not limited to the example. Paired magnetic sensors 30A and 30B are arranged close to the outer periphery of the rotor 20 and opposite each other on a first straight line 91 passing through the center of rotation P. Paired magnetic sensors 30C and 30D are arranged close to the outer periphery of the rotor 20 and opposite each other on a second straight line 92 extending orthogonally to the first straight line 91 and through the center of rotation P. The magnetic sensors 30A, 30B, 30C, and 30D are fixedly arranged at angular intervals of 90 degrees with respect to the center of rotation P. Even with rotation of the rotor 20, the distance between the center of rotation P and each of the magnetic sensors 30A, 30B, 30C, and 30D remains constant.

To be distinguished from one another, the magnetic sensors 30A, 30B, 30C, and 30D shown in FIG. 2 are denoted by different reference numerals for convenience. However, the magnetic sensors 30A, 30B, 30C, and 30D substantially have the same configuration as that of the magnetic sensor 30. Thus, when the magnetic sensors 30A, 30B, 30C, and 30D need not be distinguished from one another, the magnetic sensors 30A, 30B, 30C, and 30D are simply collectively referred to as the magnetic sensor 30.

Figure 4:
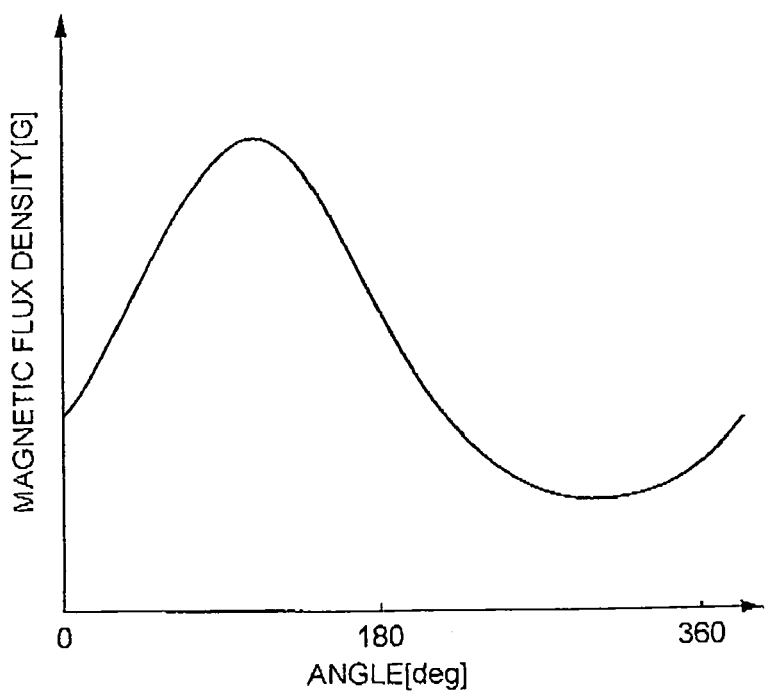
FIG. 4 is a graph showing variation in magnetic flux density with respect to the angle of rotation of a rotor.
Figure 5:
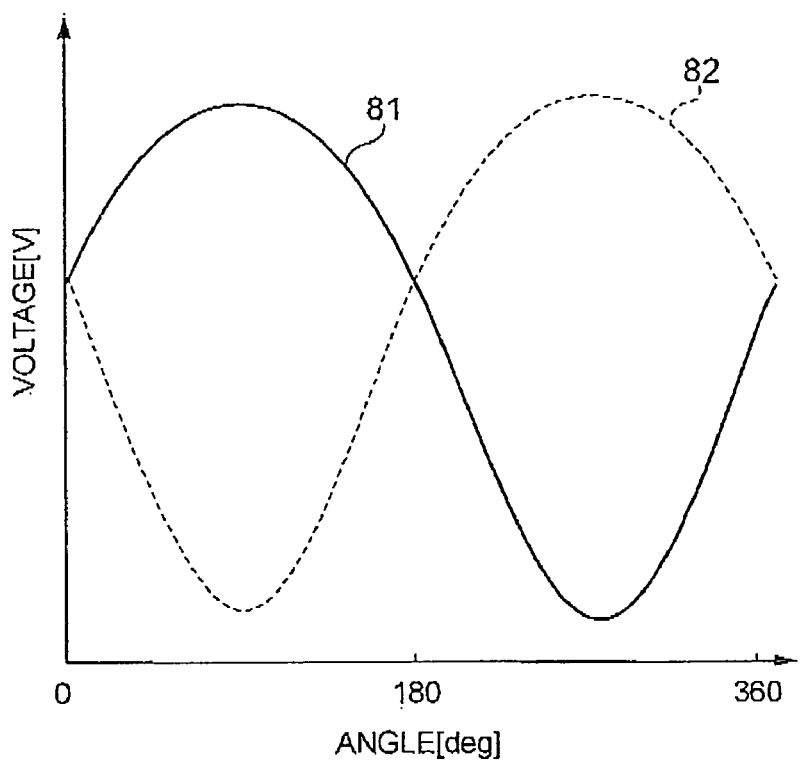
FIG. 5 is a graph showing two detection signals output by respective paired magnetic sensors arranged opposite each other.

When the rotor 20 makes one rotation, a waveform showing variation in the magnetic flux density of an external magnetic field passing through the magnetic sensor 30 exhibits one period of variation as shown in FIG. 4. The rotor 20 is shaped like a combination of two different semiellipses. Thus, the magnetic flux density waveform shown in FIG. 4 is not sinusoidal in a strict sense but is similar to a sine waveform. As described above, there is a linear relationship between the magnetic flux passing through the magnetoresistance effect element 31 and the output voltage from the magnetoresistance effect element 31. Thus, the detection signal output by the magnetic sensor 30 has a waveform similar to that of a sine wave. The rotor 20 is shaped such that for any straight line passing through the center of rotation P of the rotor 20, the distance between two points where the straight line crosses the outer periphery of the rotor 20 is constant. Consequently, when a change occurs in the first distance between the outer periphery of the rotor 20 and one of the paired magnetic sensors 30A and 30B arranged opposite each other that is, the magnetic sensor 30A, the second distance between the outer periphery of the rotor 20 and the other magnetic sensor 30B changes complementarily in conjunction with the change in the first distance. That is, a decrease in first distance correspondingly increases the second distance. This is because the paired magnetic sensors are arranged opposite each other, that is, at an angle of 180 degrees to each other. Thus, the detection signals from the magnetic sensors 30A and 30B have a phase difference of 180 degrees as shown in FIG. 5. In FIG. 5, reference numeral 81 denotes the detection signal from the magnetic sensor 30A. Reference numeral 82 denotes the detection signal from the magnetic sensor 30B. The detection signals from the other paired magnetic sensors 30C and 30D arranged opposite each other also have a phase difference of 180 degrees.

Figure 6:
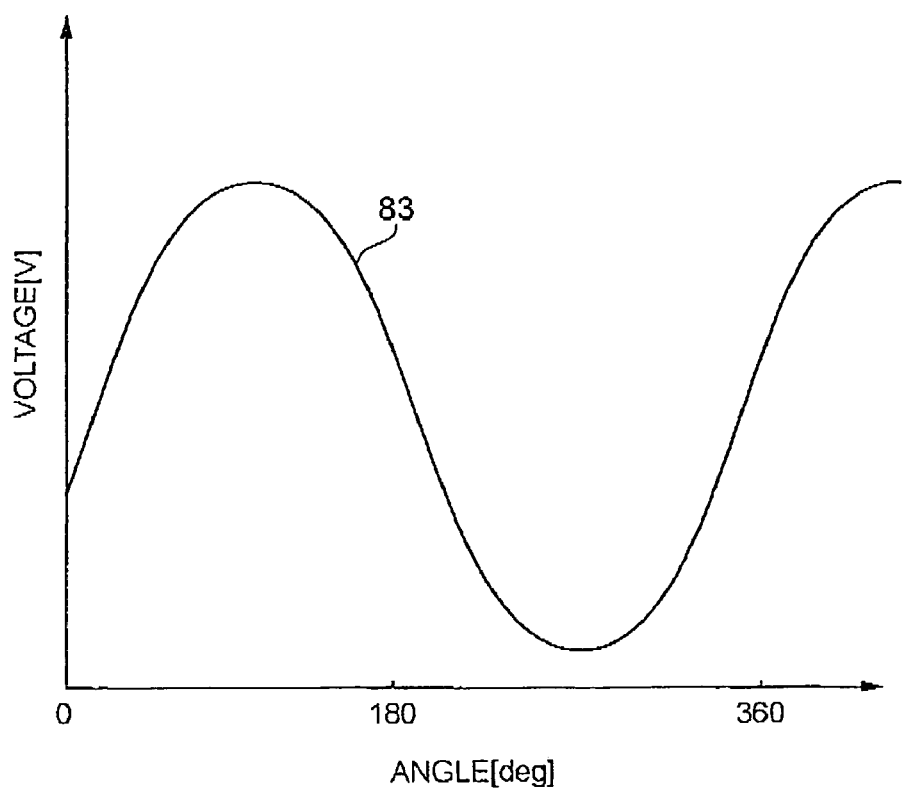
FIG. 6 is a graph showing a signal obtained by performing differential operation on the two detection signals output by the respective paired magnetic sensors arranged opposite each other.

The angle detecting apparatus 10 includes, in addition to the above-described rotor 20 and magnetic sensor 30, differential operational circuits 41 and 42 and an angle calculating circuit 50. The functions of the differential operational circuits 41 and 42 and the angle calculating circuit 50 are fulfilled by an IC chip (not shown in the drawings) mounted on the printed circuit board 70. The differential operational circuit 41 differentially processes two detection signals output by the pair of magnetic sensors 30A and 30B to calculate a sin signal. Reference numeral 83 in FIG. 6 denotes a sin signal obtained by performing differential operation on the two detection signals 81 and 82 shown in FIG. 5 The sin signal is a substantial sine wave signal with a waveform very similar to the ideal sine waveform. The differential operational circuit 42 differentially processes two detection signals output by the different pair of magnetic sensors 30C and 30D to calculate a cos signal. The cos signal is a substantial sine wave signal with a waveform very similar to the ideal sine waveform, and has a phase difference of 90 degrees from the sin signal. The angle calculating circuit 50 calculates the angle of rotation of the rotor 20 based on the sin signal, output by the differential operational circuit 41, and the cos signal, output by the differential operational circuit 42.

It should be noted that the pair of magnetic sensors 30C and 30D is not essential for detecting the angle of the rotor 20 and that the angle detection can be achieved using only the pair of magnetic sensors 30A and 30B. The longitudinal direction of the free magnetic layer in the magnetoresistance effect element 31 is not particularly limited. However, the results of the present inventors' experiments show that the angle detection can be accurately achieved particularly when the free magnetic layer is magnetized in a direction toward the center of rotation P (rotational-center direction). This is expected to be because when the longitudinal direction of the free magnetic layer is set, for example, to be orthogonal to the center of rotation, the magnetoresistance effect element 31 detects the average magnetic field that depends on the angle of rotation all over the longitudinal direction of the free magnetic layer, resulting in a significant detection error compared to the case where the longitudinal direction of the free magnetic layer is toward the center of rotation. An MR element, an AMR element, a TMR element, or the like may be applied as the magnetoresistance effect element in addition to a GMR element.

Figure 7:
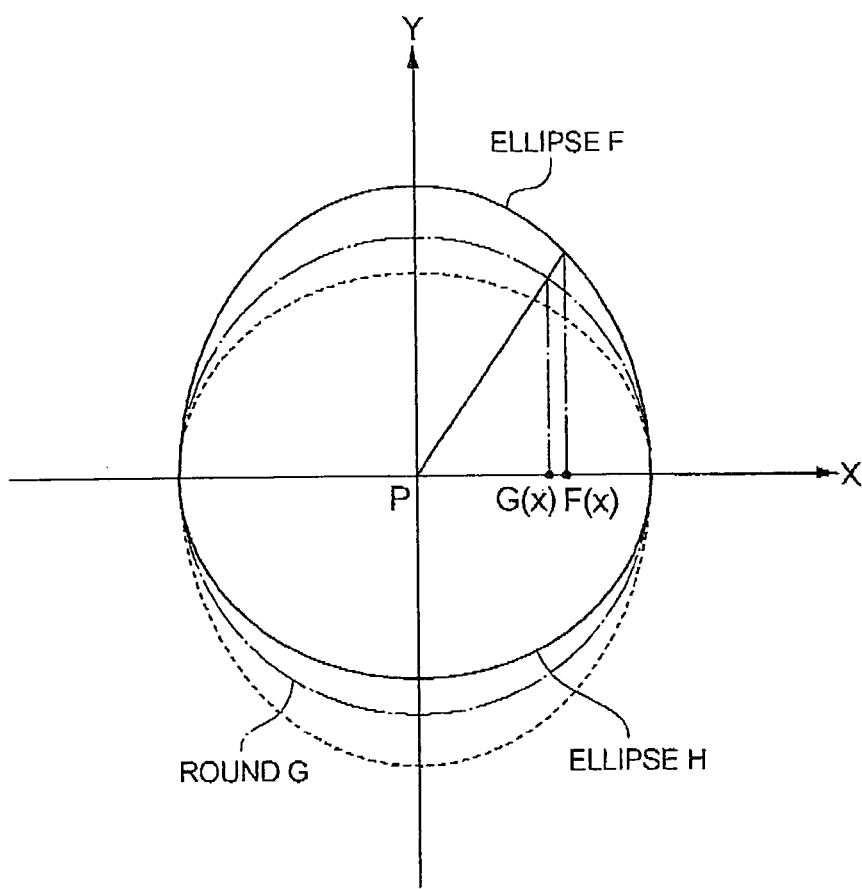
FIG. 7 is a diagram illustrating a method for calculating the planar shape of the rotor.

Now, with reference to FIG. 7, a method of calculating the planar shape of the rotor 20 will be described.

Here, the planar shape of the rotor 20 corresponds to a combination of a semiellipse F ($Y \geq 0$) and a semielliptic function H ($Y \leq 0$) in an XY coordinate system. In a case discussed below, the ellipse F is known, and the elliptic function H is calculated.

The ellipse F (x, y) is defined as follows:

$$(x, y) = (L \cos \theta, L \sin \theta) \tag{1}$$

$$x^2 + y^2/a^2 = r^2 \tag{2}$$

$$y \geq 0 \tag{3}$$

Here, the origin of the XY coordinate system coincides with the center of rotation P. The distance between the center of rotation P and a point on the ellipse F is indicated by:

$$(r^2/(\cos^2 \theta + \sin^2 \theta/a^2))^{1/2} = L \tag{4}$$

Thus, substituting Expression (4) into Expression (1) allows the coordinates of the ellipse F to be expressed using $\theta$.

The elliptic function H(X, Y) needs to meet the condition that for any straight line passing through the center of rotation P of the rotor 20, the distance between two points where the straight line crosses the outer periphery of the rotor 20 is constant. Thus, the following expressions hold true.

$$H(X) = X = 2r \cos \theta - F(x) \tag{5}$$

$$H(Y) = Y = 2r \sin \theta - F(y) \tag{6}$$

F(x) and F(y) denote the X and Y coordinates of the point where the straight line passing through the center of rotation P crosses the ellipse F. That is, the angle between the X axis and the line from the center of rotation to H satisfying Expressions (5) and (6) is the same as that between the X axis and the line from the center of rotation to F satisfying Expressions (5) and (6). Defining the function F (not limited to the ellipse) by Expressions (5) and (6) enables the coordinates of the corresponding function H (not limited to the elliptic function) to be determined.

Figure 8:
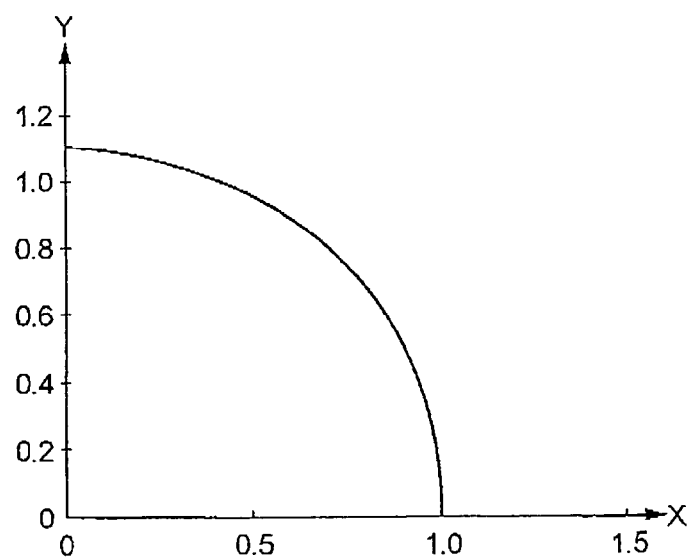
FIG. 8 is a graph of an elliptic function H(X,Y) for a=0.9.
Figure 9:
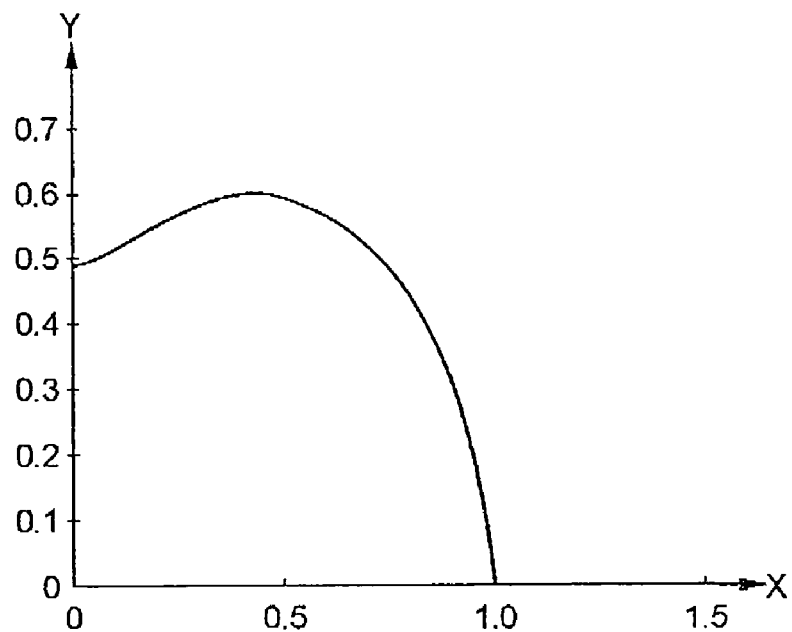
FIG. 9 is a graph of an elliptic function H(X,Y) for a=1.5.
Figure 10:
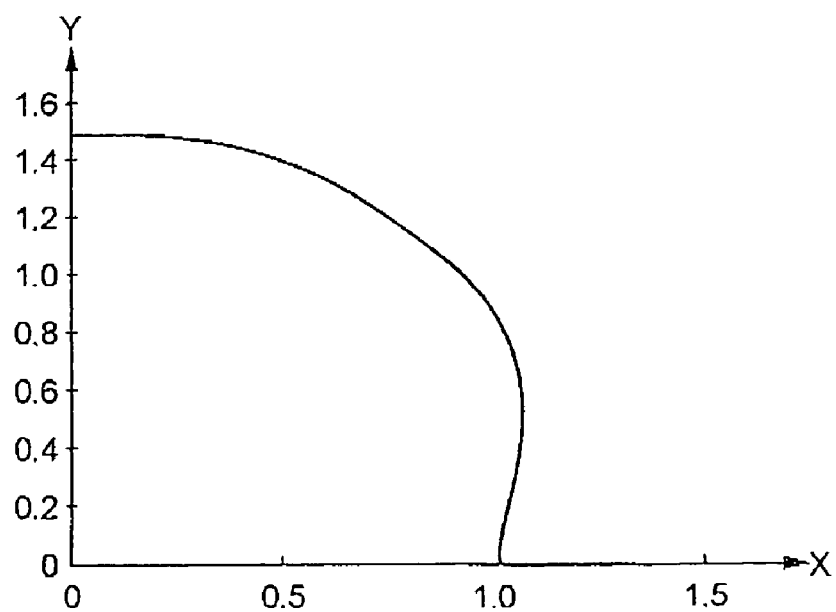
FIG. 10 is a graph of an elliptic function H(X,Y) for a=0.5.

Here, for a=0.9, Expressions (5) and (6) expressed on the XY coordinate system corresponds to such a waveform as shown in FIG. 8 (r=1). However, the waveform varies depending on the value of (a). For example, for a=1.5, the waveform has a trough at X=0 as shown in FIG. 9. For a=0.5, X=r when Y>0 as shown in FIG. 10, that is, the waveform has an inflection point where the sign of the curvature changes. In the cases shown in FIGS. 9 and 10, magnetic fields are expected to be disturbed at the trough portion and the inflection point, possibly making the detection output unstable. Thus, the rotor preferably has neither such a trough potion as shown in FIG. 8 nor the inflection point where the sign of the curvature changes.

Consequently, the preferable rotor is a combination of an ellipse ($x^2 + y^2/a^2 = r^2$) and an elliptic function having no trough portion or inflection point where the sign of the curvature changes, within the range of 0<a<2 (the condition under which the coordinate origin is present in a closed curved line; a=1 is excluded from the range). This provides a sine wave exhibiting one maximum value and one minimum value during one rotation of each of the ellipses F and H. Of course, the rotor shaped so as to have no trough portion or inflection point where the sign of the curvature changes is not limited to the ellipse and elliptic function. The rotor may have any of various shapes.

The present embodiment uses the rotor 20 configured such that the distance between the two points where the straight line passing through the center of rotation P of the rotor 20 crosses the outer periphery of the rotor 20 is constant. Thus, the signal obtained by performing differential operation on the detection signals from the paired magnetic sensors 30A and 30B (or 30C and 30D) arranged opposite each other is a substantial sine wave signal containing information on the angle of rotation of the rotor 20. Consequently, angle detection can be achieved with a reduced detection error over the entire angular range (0 degrees to 360 degrees). Furthermore, the rotor 20 need not be attached to the end surface of the rotating shaft 60. Thus, the angle detecting apparatus 10 can be easily installed.

Additionally, the shape of the rotor 20 projected on the plane of rotation therefor corresponds to the combination of the two different semiellipses. Thus, the signal obtained by performing differential operation on the detection signals from the paired magnetic sensors 30A and 30B (or 30C and 30D) arranged opposite each other is a substantial sine wave signal containing information on the angle of rotation of the rotor 20. Consequently, angle detection can be achieved with a reduced detection error over the entire angular range.

Embodiment 2

Figure 11:
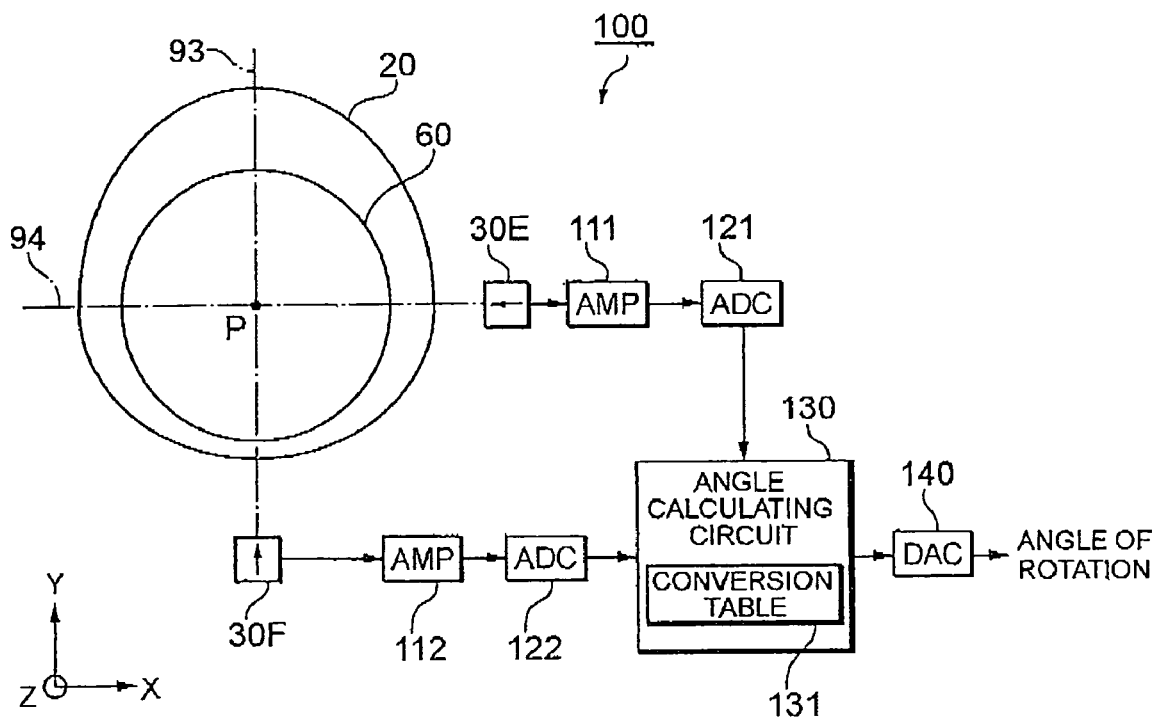
FIG. 11 is a diagram schematically illustrating the configuration of an angle detecting apparatus according to Embodiment 2.

FIG. 11 is a diagram schematically illustrating the configuration of an angle detecting apparatus 100 according to Embodiment 2.

The angle detecting apparatus 100 includes, as main components, a rotor 20 fixed to a rotating shaft 60, two magnetic sensors 30E and 30F arranged close to the outer periphery of the rotor 20, and an angle calculating circuit 130 that outputs the angle of rotation of the rotor 20 based on detection signals output by the two magnetic sensors 30E and 30F. To be distinguished from each other, the magnetic sensors 30E and 30F are denoted by different reference numerals for convenience. However, the magnetic sensors 30E and 30F have substantially the same configuration as that of the magnetic sensor 30 shown in FIG. 1. The magnetic sensor 30E is positioned on an alternate long and short dash line 93 passing through the center of rotation P of the rotor 20. The magnetic sensor 30F is positioned on an alternate long and short dash line 94 passing through the center of rotation P. The two alternate long and short dash lines 93 and 94 cross at 90 degrees. The distance between the center of rotation P and the magnetic sensor 30E is the same as that between the center of rotation P and the magnetic sensor 30F. Thus, the two magnetic sensors 30E and 30F are arranged at the equal distance from the center of rotation P so as to have a difference of 90 degrees in phase (mechanical angle) with respect to the center of rotation P of the rotor 20. The magnetic sensor 30E detects a change in magnetic fields corresponding to a change in the first distance between the outer periphery of the rotor 20 and the magnetic sensor 30E which distance varies periodically in conjunction with rotation of the rotor 20, to output a first, substantial sine wave signal with a waveform similar to a sinusoidal one. The magnetic sensor 30F detects a change in magnetic fields corresponding to a change in the second distance between the outer periphery of the rotor 20 and the magnetic sensor 30F which distance varies periodically in conjunction with rotation of the rotor 20, to output a second, substantial sine wave signal with a waveform similar to a sinusoidal one. The first and second, substantial sine wave signals are detection signals having a difference of 90 degrees in phase (electrical angle). For convenience of description, the detection signal output by the magnetic sensor 30E is hereinafter referred to as a cos signal. The detection signal output by the magnetic sensor 30F is hereinafter referred to as a sin signal. The angle calculating circuit 130 holds a conversion table 131. The angle calculating circuit 130 thus reads the angle of rotation of the rotor 20 corresponding to each of the cos and sin signals output by the magnetic sensors 30E and 30F from a conversion table 131, to output the read rotation angle. The conversion table 131 is created by calibration carried out, for example, before shipment or after mounting of the rotating shaft 60.

Now, a method for creating the conversion table 131 will be described.

Figure 12:
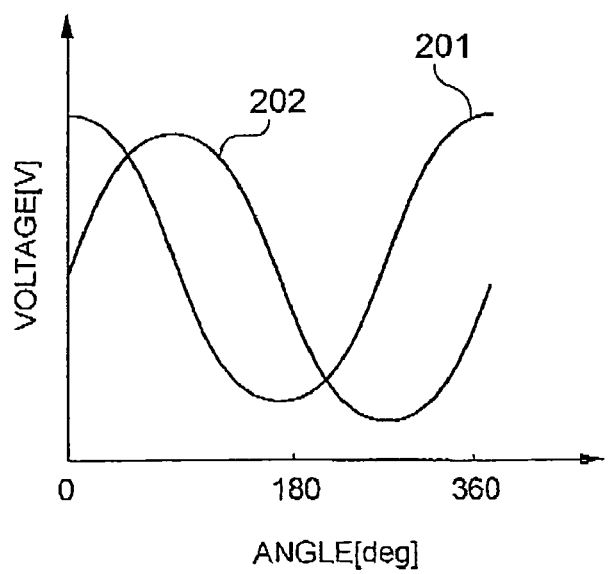
FIG. 12 a graph showing a cos signal and a sin signal before calibration.
Figure 13:
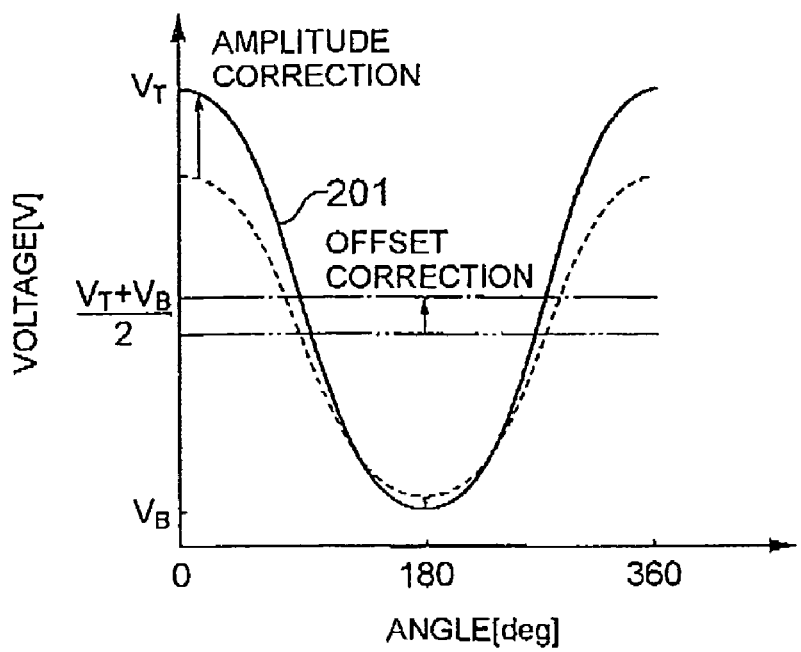
FIG. 13 is a diagram illustrating amplitude correction and offset correction for the cos signal.
Figure 14:
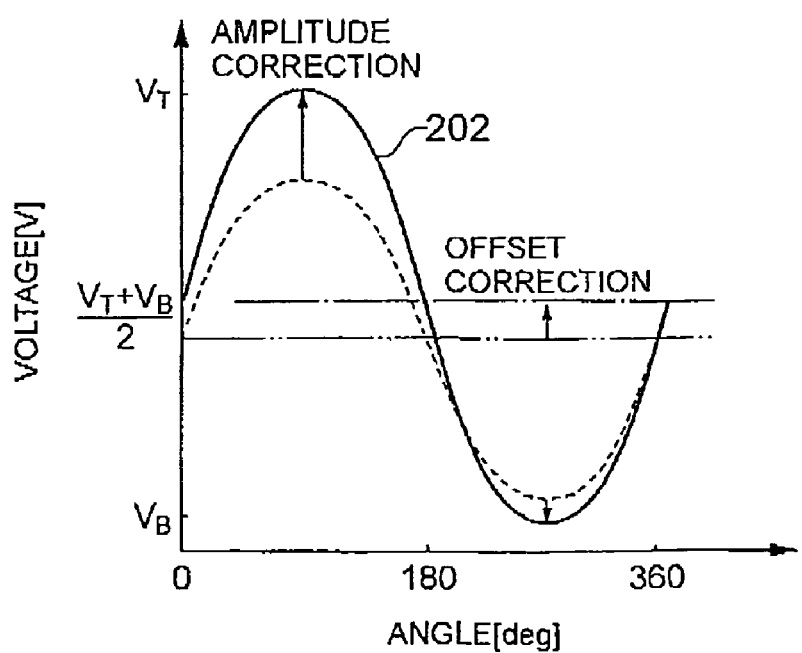
FIG. 14 is a diagram illustrating amplitude correction and offset correction for the sin signal.

FIG. 12 shows a cos signal 201 and a sin signal 202 which have not been calibrated. Before calibration, the amplitude and intermediate value of the cos signal 201 normally do not match those of the sin signal 202. Thus, one period of waveforms of the cos signal 201 and the sin signal 202 are retrieved, and the amplitude and intermediate value of each of the cos signal 201 and the sin signal 202 are calculated. Then, as shown in FIGS. 13 and 14, so that after calibration, the cos signal 201 and the sin signal 202 have an upper limit value $V_T$, a lower limit value $V_B$, and an intermediate value $(V_T+V_B)/2$, the following are adjusted: the gain and offset value of an amplifier 111 amplifying the cos signal 201 output by the magnetic sensor 30E and the gain and offset value of an amplifier 112 amplifying the sin signal 202 output by the magnetic sensor 30F. Thus, amplitude adjustment and offset correction are carried out on the detection signals. In FIGS. 13 and 14, the dashed line shows a signal waveform before calibration. The solid line shows a signal waveform after calibration. The alternate long and short dash line shows an intermediate value after offset correction. The alternate long and two short dashes line shows an intermediate value before offset correction.

Figure 15:
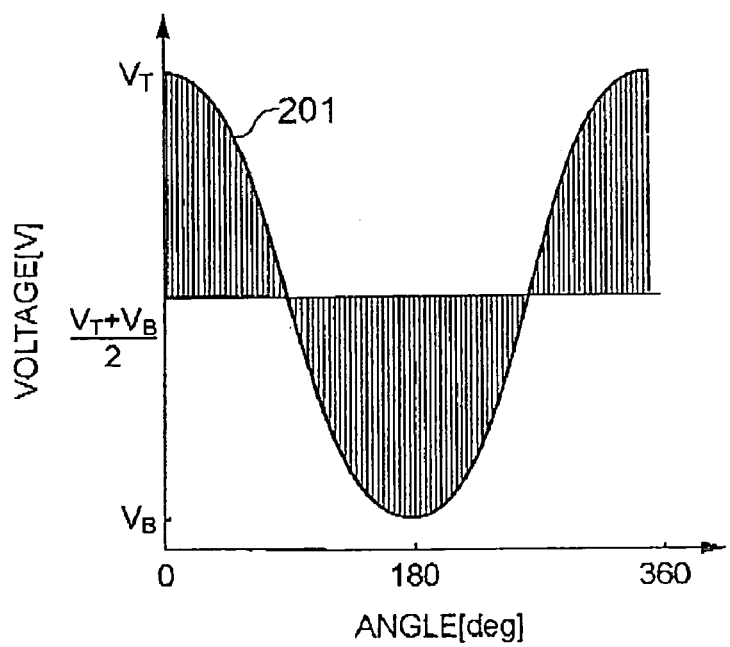
FIG. 15 is a diagram illustrating digital sampling of the cos signal.
Figure 16:
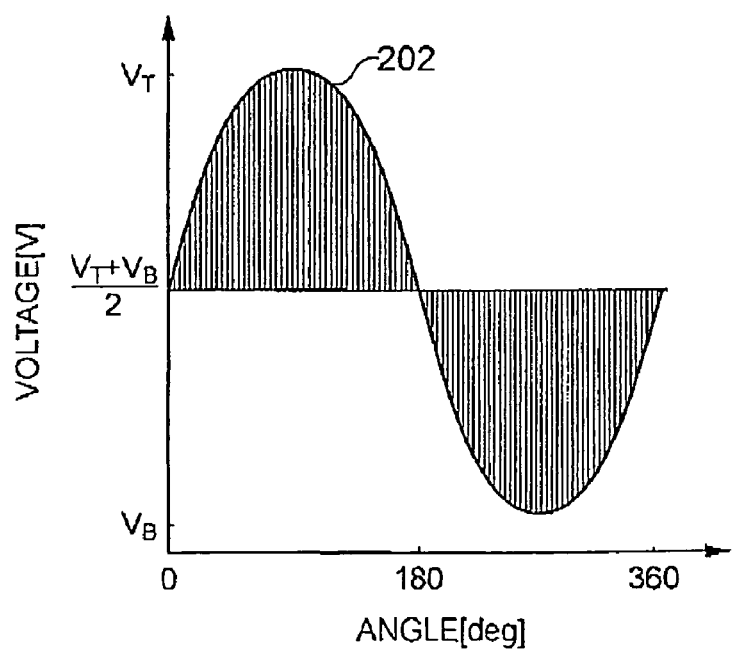
FIG. 16 is a diagram illustrating digital sampling of the sin signal.

The cos signal 201 and sin signal 202 after calibration are converted into digital data by A/D converters 121 and 122, respectively. The digital data is then supplied to the angle calculating circuit 130. As shown in FIGS. 15 and 16, the angle calculating circuit 130 samples the digitalized cos signal 201 and sin signal 202 at equal angular intervals for one period. The angle calculating circuit 130 then stores the sampled read data in the conversion table 131 as a cos signal read value 152 and a sin signal read value 153 (see FIG. 17). For example, an angular accuracy of at most 0.1 degree is required to provide a resolution for an angle of rotation of 0.2 degrees. Thus, preferably, the cos signal 201 and the sin signal 202 are sampled at an angular accuracy of at most 0.1 degree so that the sampled read data is stored in the conversion table 131. The time of one period of the digitalized cos signal 201 and sin signal 202 can be calculated to be the interval between the upper limit values (or the interval between the lower limit values). Furthermore, a determination criterion of 0 degrees may be set at the point in time when the cos signal 201 takes the upper limit value or the sin signal 202 takes the intermediate value.

Figure 17:
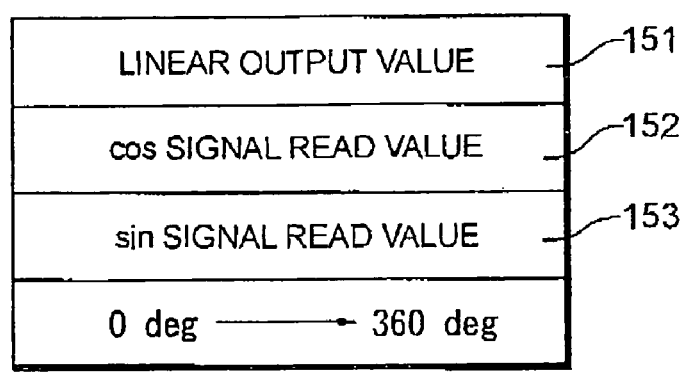
FIG. 17 is a diagram illustrating a conversion table.
Figure 19:
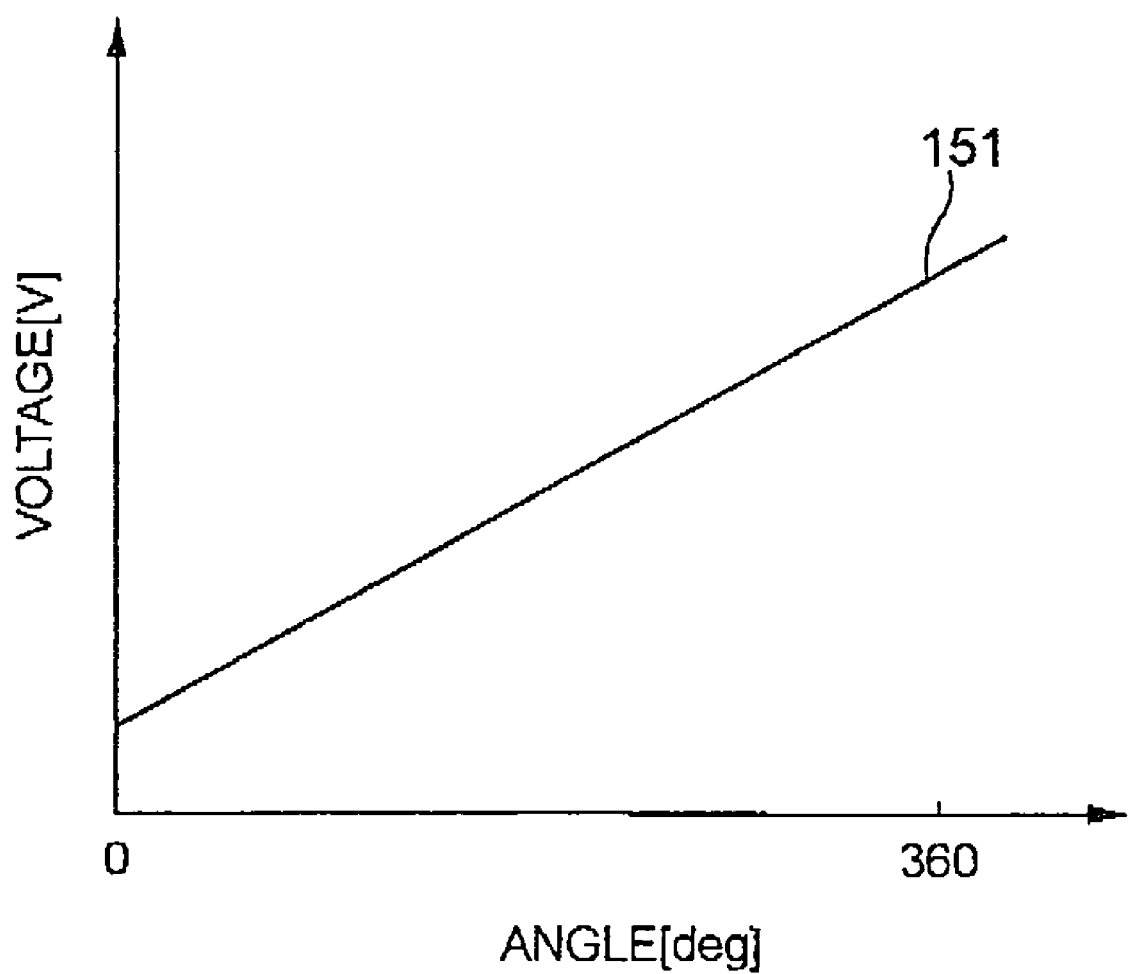
FIG. 19 is a graph of a linear output value.

As shown in FIG. 17, in the conversion table 131, a linear output value 151, a cos signal read value 152, and a sin signal read value 153 are associated with one another over the angular range of 0 degrees to 360 degrees. As shown in FIG. 19, the linear output value 151 is pre-created into map data increasing linearly and monotonously over the angular range of 0 degrees to 360 degrees. For example, so as to be within the range of 1.0 V to 4.0 V, the linear output value 151 may be set to 1.0 V at 0 degrees, to 2.5 V at 180 degrees, and to 4.0 V at 359 degrees so that the angle of rotation of the rotor 20 and the linear output value 151 have a linear relationship. The output range of the linear value 151 can be optionally adjusted and is not limited to the above-described numerical values. Furthermore, the linear output value 151 may be created into map data increasing linearly and monotonously over the angular range of 0 degrees to 360 degrees.

Now, description will be given of a method of determining the angle of rotation of the rotor 20 using the conversion table 131 created through the above-described procedure. The cos signal 201 and sin signal 202 output by the magnetic sensors 30E and 30F are subjected to amplitude adjustment and offset correction by amplifiers 111 and 112. The resulting cos signal 201 and sin signal 202 are sampled at equal angular intervals by A/D converters 121 and 122. The sampled signals are supplied to the angle calculating circuit 130. The angle calculating circuit 130 retrieves the cos signal read value 152 matching the sampling data of the read cos signal 201, from the conversion table 131. The angle calculating circuit 130 then reads the linear output value 151 corresponding to the retrieved cos signal read value 152, from the conversion table 131. The angle calculating circuit 130 further retrieves the sin signal read value 153 matching the sampling data of the read sin signal 202, from the conversion table 131. The angle calculating circuit 130 then reads the linear output value 151 corresponding to the retrieved sin signal read value 153, from the conversion table 131. The thus read linear output value 151 is converted, by a D/A converter 140, into analog data in the form of a signal indicating the angle of rotation of the rotor 20.

Figure 18:
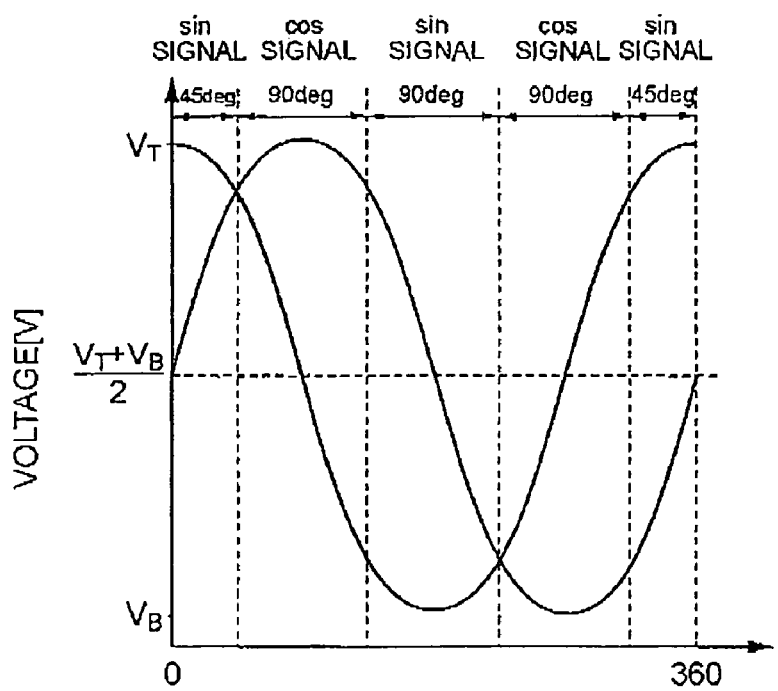
FIG. 18 is a diagram illustrating the read ranges of the cos signal and the sin signal.

At this time, as shown in FIG. 18, the angle calculating circuit 130 preferably reads sampling data falling within the angular range of ±45 degrees from the angle at which the signal waveform of each of the cos signal 201 and the sin signal 202 takes the intermediate value. For example, within the angular range of 0 degrees to 45 degrees, the sin signal 202 has a larger detection signal amplitude change amount than the cos signal 201. Thus, the sampling data of the sin signal 202 is read. Within the angular range of 45 degrees to 135 degrees, the cos signal 201 has a larger detection signal amplitude change amount than the sin signal 202. Thus, the sampling data of the cos signal 201 is read. Within the angular range of 135 degrees to 225 degrees, the sin signal 202 has a larger detection signal amplitude change amount than the cos signal 201. Thus, the sampling data of the sin signal 202 is read. In this manner, sampling data close to the intermediate value, at which the amplitude changes significantly, is read instead of sampling data dose to the peak of the signal waveform, at which the amplitude changes insignificantly. This enables a reduction in variation in detection error and also improves resistance to noise.

The angle detection method according to Embodiment 2 is applicable to the angle detecting apparatus 10 according to Embodiment 1. The principle of the method will be described in brief. For example, in FIG. 1, the sin signal and the cos signal have a phase difference of 90 degrees (electrical angle); the sin signal is obtained by performing differential operation on the detection signals from magnetic sensors 30A and 30B with the differential operational circuit 41, and the cos signal is obtained by performing differential operation on the detection signals from magnetic sensors 30C and 30D with the differential operational circuit 42. The angle calculating circuit 50 in which a conversion table similar to the above-described conversion table 131 is pre-mounted can sample and read the sin signal and cos signal output by differential operational circuits 41 and 42, retrieve the angle of rotation of the rotor 20 corresponding to the read sampling data, and output the retrieved angle of rotation. Here, preferably, in the cos signal and sin signal output by the differential operational circuits 41 and 42, sampling data is read which falls within the angular range of ±45 degrees from the angle at which the signal waveform of each of the cos signal and the sin signal takes the intermediate value.

The present invention can be utilized for an apparatus and a method for calculating the angle of rotation of a rotating shaft used for a driving mechanism in various technical fields.

What is claimed is:
1. An angle detecting apparatus comprising:
a rotor fixed to a rotating shaft, the rotor being such that a distance between two points where a straight line passing through a center of rotation of the rotor crosses an outer periphery of the rotor is constant;
a first magnetic sensor and a second magnetic sensor arranged opposite each other and close to the outer periphery of the rotor, the first magnetic sensor detecting a change in a magnetic field corresponding to a change in a first distance between the outer periphery of the rotor and the first magnetic sensor which distance varies periodically in conjunction with rotation of the rotor, thereby outputting a first detection signal, the second magnetic sensor detecting a change in a magnetic field corresponding to a change in a second distance between the outer periphery of the rotor and the second magnetic sensor which distance varies complementarily in conjunction with the variation in the first distance, thereby outputting a second detection signal;
differential operation means for performing differential operation on the first detection signal and the second detection signal; and
angle calculating means for calculating an angle of rotation of the rotating shaft based on a result of the differential operation by the differential operation means.
2. The angle detecting apparatus according to claim 1, wherein the shape of the rotor projected on a plane of rotation is a combination of two different semiellipses.
3. The angle detecting apparatus according to claim 1, wherein the rotor is made of a ferromagnetic material,
the first magnetic sensor comprises a first magnet generating a magnetic field between the outer periphery of the rotor and the first magnetic sensor, and a first magnetoresistance effect element outputting the first detection signal in response to the magnetic field varying in response to variation in the first distance, and
the second magnetic sensor comprises a second magnet generating a magnetic field between the outer periphery of the rotor and the second magnetic sensor, and a second magnetoresistance effect element outputting the second detection signal in response to the magnetic field varying in response to variation in the second distance.
4. The angle detecting apparatus according to claim 3, wherein the first magnetoresistance effect element comprises a first free magnetic layer whose longitudinal direction is set to align with a direction of the center of rotation of the rotor, and the second magnetoresistance effect comprises a second free magnetic layer whose longitudinal direction is set to align with the direction of the center of rotation of the rotor.

5. An angle detecting method of detecting an angle of rotation of a rotating shaft using a first magnetic sensor and a second magnetic sensor arranged opposite each other and close to an outer periphery of a rotor fixed to the rotating shaft, the method comprising the steps of:
rotating the rotor together with the rotating shaft, the rotor being such that a distance between two points where a straight line passing through a center of rotation of the rotor crosses the outer periphery of the rotor is constant;
allowing a first detection signal to be output by the first magnetic sensor detecting a change in a magnetic field corresponding to a change in a first distance between the outer periphery of the rotor and the first magnetic sensor which distance varies periodically in conjunction with rotation of the rotor;
allowing a second detection signal to be output by the second magnetic sensor detecting a change in a magnetic field corresponding to a change in a second distance between the outer periphery of the rotor and the second magnetic sensor which distance varies complementarily in conjunction with the variation in the first distance;
performing differential operation on the first detection signal and the second detection signal; and
calculating the angle of rotation of the rotating shaft based on a result of the differential operation.

6. The angle detecting method according to claim 5, wherein the shape of the rotor projected on a plane of rotation is a combination of two different semiellipses.

7. The angle detecting method according to claim 5, wherein the rotor is made of a ferromagnetic material,
the first magnetic sensor comprises a first magnet generating a magnetic field between the outer periphery of the rotor and the first magnetic sensor, and a first magnetoresistance effect element outputting the first detection signal in response to the magnetic field varying in response to variation in the first distance, and
the second magnetic sensor comprises a second magnet generating a magnetic field between the outer periphery of the rotor and the second magnetic sensor, and a second magnetoresistance effect element outputting the second detection signal in response to the magnetic field varying in response to variation in the second distance.

8. The angle detecting method according to claim 7, wherein the first magnetoresistance effect element comprises a first free magnetic layer whose longitudinal direction is set to align with a direction of the center of rotation of the rotor, and
the second magnetoresistance effect element comprises a second free magnetic layer whose longitudinal direction is set to align with the direction of the center of rotation of the rotor.

9. An angle detecting apparatus comprising:
a rotor fixed to a rotating shaft, the rotor being such that a distance between two points where a straight line passing through a center of rotation of the rotor crosses an outer periphery of the rotor is constant;
a first magnetic sensor and a second magnetic sensor arranged at an equal distance from the center of rotation so as to have a phase difference of 90 degrees with respect to the center of rotation of the rotor, the first magnetic sensor detecting a change in a magnetic field corresponding to a change in a first distance between the outer periphery of the rotor and the first magnetic sensor which distance varies periodically in conjunction with rotation of the rotor, thereby outputting a first detection signal, the second magnetic sensor detecting a change in a magnetic field corresponding to a change in a second distance between the outer periphery of the rotor and the second magnetic sensor which distance varies periodically in conjunction with the rotation of the rotor, thereby outputting a second detection signal;
a conversion table storing an angle of rotation of the rotating shaft corresponding to each of the first and second detection signals; and
angle calculating means for comparing the conversion table with each of the first and second detection signals output by the first and second magnetic sensors to output the angle of rotation of the rotor.

10. The angle detecting apparatus according to claim 9, wherein each of the first and second detection signals is a substantial sine wave signal, and
the angle calculating means compares the conversion table with one of the first and second detection signals which falls within an angular range of ±45 degrees from an angle at which the detection signal takes an intermediate value, thereby outputting the angle of rotation of the rotor.

11. An angle detecting method of detecting an angle of rotation of a rotating shaft using a first magnetic sensor and a second magnetic sensor arranged at an equal distance from a center of rotation of a rotor fixed to the rotating shaft so as to have a phase difference of 90 degrees with respect to the center of rotation, the method comprising the steps of:
rotating the rotor together with the rotating shaft, the rotor being such that a distance between two points where a straight line passing through the center of rotation of the rotor crosses the outer periphery of the rotor is constant;
allowing a first detection signal to be output by the first magnetic sensor detecting a change in magnetic field corresponding to a change in first distance between the outer periphery of the rotor and the first magnetic sensor which distance varies periodically in conjunction with rotation of the rotor;
allowing a second detection signal to be output by the second magnetic sensor detecting a change in magnetic field corresponding to a change in second distance between the outer periphery of the rotor and the second magnetic sensor which distance varies periodically in conjunction with the rotation of the rotor; and
comparing a conversion table with each of the first and second detection signals output by the first and second magnetic sensors, thereby outputting the angle of rotation of the rotor, wherein the conversion table stores the angle of rotation of the rotating shaft corresponding to each of the first and second detection signals.

12. The angle detecting method according to claim 11, wherein each of the first and second detection signals is a substantial sine wave signal, and
outputting the angle of rotation comprises comparing the conversion table with one of the first and second detection signals which falls within an angular range of ±45 degrees from an angle at which the detection signal takes an intermediate value, thereby outputting the angle of rotation of the rotor.

* * * * *